United States Patent [19]

Hilmer

[11] 4,192,341

[45] Mar. 11, 1980

[54] DRAIN TRAP VALVE MECHANISM

[75] Inventor: Milton Hilmer, Quakertown, Pa.

[73] Assignee: Sarco Company, Inc., Quakertown, Pa.

[21] Appl. No.: 906,930

[22] Filed: May 18, 1978

[51] Int. Cl.² ............................................. F16K 31/26
[52] U.S. Cl. .................................. 137/445; 137/449;
 137/192; 251/279; 251/280
[58] Field of Search ............... 137/192, 193, 434, 445,
 137/449; 251/231, 232, 279, 280

[56] References Cited

U.S. PATENT DOCUMENTS

| 1,529,140 | 3/1925 | Muller ................................... 137/445 |
| 1,893,859 | 1/1933 | Gleason et al. ....................... 137/445 |
| 2,092,670 | 9/1937 | Hess et al. ............................ 137/445 |
| 2,790,456 | 4/1957 | Shaw et al. ........................... 137/434 |
| 3,324,878 | 6/1967 | Dill ....................................... 137/445 |
| 3,363,643 | 1/1968 | Skulski ................................. 137/445 |
| 3,599,659 | 8/1971 | Nuter .................................... 137/445 |
| 3,835,882 | 9/1974 | Barker et al. ......................... 251/279 |
| 3,916,945 | 11/1975 | Bennett ............................... 137/445 |

*Primary Examiner*—Martin P. Schwadron
*Assistant Examiner*—G. L. Walton
*Attorney, Agent, or Firm*—Sessions, Pearne, Gordon

[57] ABSTRACT

A float actuated valve mechanism for automatically removing a predetermined amount of accumulated liquid condensate from a sump area of a gas pressurized drain trap or the like so as to regulate the level of liquid in such a sump area. A four-bar linkage between a float and a valve plug provides a non-linearly varying mechanical advantage throughout the movement of the float. In a closed position the valve plug mates with a rigid seating surface and an elastomeric seating surface to provide a wear-resistant seal.

5 Claims, 7 Drawing Figures

DRAIN TRAP VALVE MECHANISM

BACKGROUND OF THE INVENTION

This invention relates to liquid level control valves.

More particularly, this invention relates to a float actuated valve mechanism located in the sump area of a gas pressurized drain trap or the like where an accumulated condensate derived liquid is removed at a predetermined rate via an exhaust conduit controlled by the valve mechanism.

Prior art float actuated valves of the subject type provide a relatively constant mechanical advantage between a float and a valve plug or poppet movable in response to movement of the float. A relatively high mechanical force is required to initially move the valve plug from its associated seat due to the high internal pressure of the drain trap. Such a high mechanical force is unnecessary once an open condition has been established wherein a low pressure region is created at the valve plug-valve seat interface area, such low pressure region tending to aid the movement of the valve plug away from its associated valve seat. While a high mechanical advantage and accompanying high degree of float movement are needed to initially pull the valve plug away from its associated seat, such mechanical advantage is not needed once a predetermined opening position by the valve plug has been obtained. Prior art float actuated valve mechanisms having a constant mechanical advantage between the float and the valve plug provide unnecessary movement of the float in maintaining an open valve condition thus requiring float movement space that is unnecessary.

It would be desirable to provide a valve mechanism wherein the float moves a distance necessary only to establish and maintain necessary opening forces on the valve plug. Since unnecessary movement of the float would be eliminated, such a valve mechanism would be more economical from a space requirement standpoint.

In addition to the unnecessary space requirements of prior art float actuated valves, such valves often encounter problems in maintaining a positive seal between the valve plug and an elastomeric valve seat. Such problems often developed wherein the elastomeric valve seat would, over a period of time and successive operations, fail due to excessive deformation and cold flow of the elastomeric material caused in part by forces applied to the elastomeric valve seat by the valve plug.

SUMMARY OF THE INVENTION

The present invention provides a float actuated valve mechanism for controlling the level of liquid in a sump area comprising a valve seat and an associated movable valve plug actuated via a four bar linkage operably connected between the valve plug and a float. The four bar linkage, in accordance with the invention, provides a non-linearly varying mechanical advantage between the movable float and the movable valve plug wherein maximum mechanical forces are applied to open a valve plug-valve seat interface, while decreasing mechanical forces are applied to the valve plug as the degree of opening of the valve increases. The four bars of the linkage are loosely joined by four pin joints to permit limited self-alignment movement of the valve plug relative to the valve seat with which it mates. The linkage advantageously limits movement of the float to the minimum amount required. By minimizing the movements of the float, a smaller, more efficient space conserving package is provided.

Further in accordance with the invention, an improved wear-resistant valve seat assembly is provided wherein a valve plug seats against a rigid seating surface and an elastomeric seating surface, the rigid seating surface serving to limit the loading forces applied to the elastomeric seating surface, the elastomeric seating surface only being compressed a predetermined amount necessary to establish a sealed relation between the valve plug and the elastomeric valve seating surface.

The four-bar linkage of the present invention includes a linkage base fixed relative to the valve seat, a float arm, a valve plug arm, and a connecting arm, the geometrical configuration and dimensions of which determine the specific operating parameters of the non-linearly varying mechanical advantage provided by the linkage.

DETAILED DESCRIPTION OF THE PREFERRED EMBODIMENT

Figure 1:
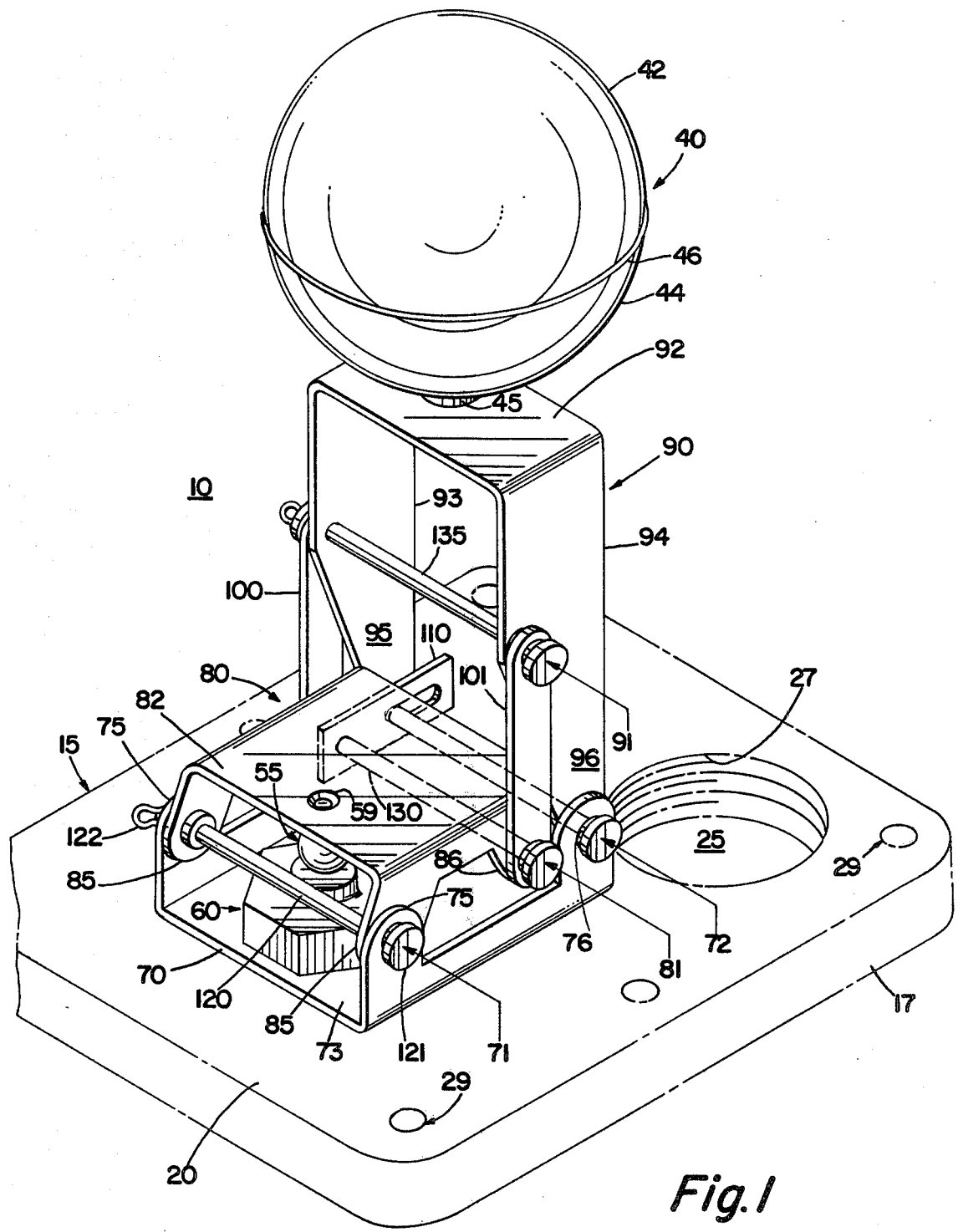
FIG. 1 is a perspective view of the float-actuated valve mechanism of the present invention in a closed position fixed to a drain trap mounting plate.

Referring to the drawings in greater detail, and in particular to FIG. 1, there is illustrated a float actuated valve mechanism 10 fixed to and supported by a drain trap mounting plate 15.

The mounting plate 15 has a peripheral edge wall 17 circumscribing a generally flat, rectangular mounting surface 20. A cylindrical, liquid condensate inlet aperture 25, defined by a threaded wall 27, extends through the wall thickness of the mounting plate 15.

A plurality of both accommodating apertures 29 are spaced about the periphery of the mounting plate 15, the apertures 29 being adjacent the edge wall 17 and extending through the wall thickness of the mounting plate 15 in directions parallel to the edge wall 17. The apertures 29 receive bolts which secure the mounting plate 15 to a housing, as shall be subsequently illustrated.

In accordance with the present invention, the float actuated valve mechanism 10 includes a hollow, spherical, movable float 40, buoyant in the particular liquid condensate with which it is intended to be used. The float 40 includes first and second hemispheroidal portions 42, 44 formed, for example, of thin sheet metal. The portions, 42, 44 are joined at their equatorial plane ends in sealed relation by, for example, a circumferentially extending seam weld 46.

A valve seat 50 (FIG. 7) includes a rigid spherical valve plug or poppet 55 (FIG. 1), movable relative to an associated valve seat body member 60, the valve plug 55 and valve seat 60 mating as illustrated in FIG. 1.

Movement of the buoyant float 40 actuates the movable valve plug 55 via an interposed four bar linkage wherein the four bars are constituted by a linkage base member 70, a valve plug arm member 80, a float arm member 90 and a connecting member constituted by a pair of connecting arms 100,101.

The linkage base 70 and the associated arms 80,90,100,101 are joined for pivotal movement relative to each other in a generally common plane by first and second linkage base pin joints 71,72, a float arm pin joint 91 and a valve plug arm pin joint 81. The exact relationship of the pin joints shall be explained in detail below.

An over-center stop link 110, connected between the valve plug arm pin joint 81 and the second linkage base pin joint 72, limits the extent of float revolution about the second linkage base pin joint 72.

The linkage base 70 is constituted by a sheet metal formed member having a flat, rectangular base portion 73 fixed in a contiguous manner against a portion of the flat surface 20 of the mounting plate 15. Two pairs of bushings defining apertured tabs 75,76 (only one of tabs 76 being illustrated in FIG. 1) extend away from the surface 20 in directions normal thereto and are generally located at the four corners of the rectangular base portion 73.

Similar in geometry to the linkage bar 70, but positioned in geometrical opposition thereto, is the valve plug arm 80 which is constituted by a sheet metal formed member having a flat, rectangular base portion 82. Two pairs of bushings defining apertured tabs 85,86 (only one of tabs 86 being illustrated) extend from the base portion 77 towards the mounting plate surface 20.

In the closed position of the valve mechanism 10, illustrated in FIG. 1, the base portions 73,82 of the linkage base 70 and valve plug arm 80, respectively, are generally parallel to each other, with the pairs of tabs 75,85 associated with the first linkage base pin joint 71 being pivotal about a common axis provided by an elongated pin 120 inserted through the apertured tabs 75,85, as illustrated. The axial movement of the pin 120 is limited in a conventional manner by a head portion 121 and a spring wire retaining clip 122.

The float arm 90 is constituted by a member having a U-shaped longitudinal cross-section. The float 40 is mounted and fixed relative to the central area of a flat rectangular base portion 92 of the float arm 80 by means of an appropriate coupling 45 which maintains the sealed integrity of the hollow float 40.

A pair of float arm legs 93,94 having their distal ends 95,96 apertured to define bushings are each aligned with respective tabs 76 associated with the second linkage base pin joint 72. The float arm 90 and linkage base 70 are pivotally connected to each other by an elongated pin 125 in a manner as previously described with regard to the first linkage base pin joint 71.

The float arm 90 is pivotally moumted about the axis of the pin 125 by the second linkage base pin joint 72 about which the float 40 revolves. The valve plug 55, fixed to the valve plug arm 80, revolves about the first linkage base pin joint 71.

Transfer of float arm movement forces to the valve plug arm 75 is provided by elongated connecting arms 100,101 having each of their ends apertured to define bushings. Each of the connecting arms 100,101 has one of its ends pivotally connected to the pair of tabs 86 associated with the valve plug arm pin joint 81, while their other ends are pivotally connected to the float arm pin joint 91 located intermediate the float 40 and the second linkage base pin joint 72. The pin joints 81,91 include elongated pins 130,135 arranged to provide pivotal movements as earlier described with regard to the first linkage base pin joing 71. It can be seen that upon movement of float 40, the connecting arms pivot or revolve simultaneously about the float arm pin joint 91 and the valve plug arm pin joint 81.

Figure 2:
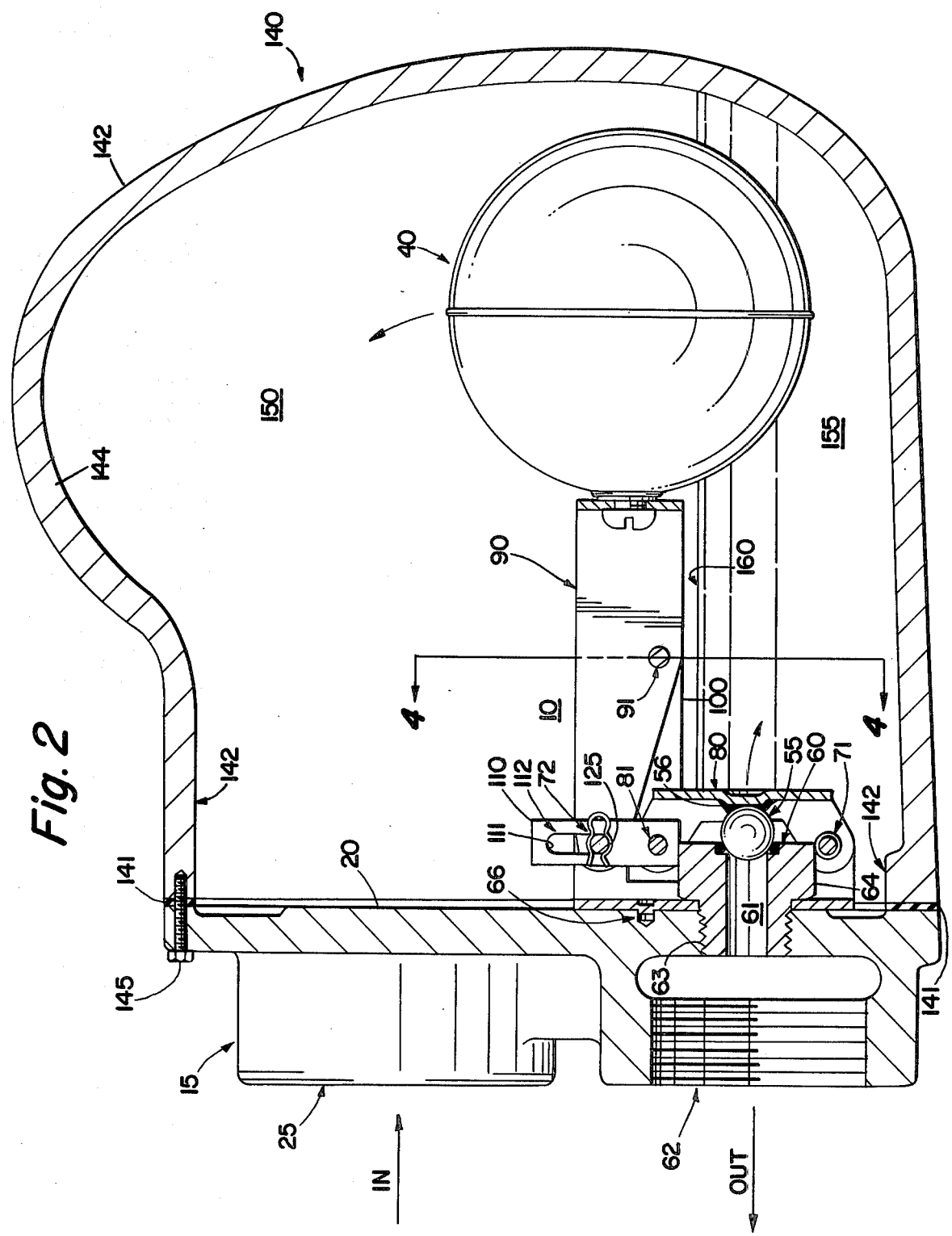
FIG. 2 is a cross sectional elevating view of a complete drain trap incorporating the float actuated valve mechanism illustrated in FIG. 1.

Turning to FIG. 2, the float actuated valve mechanism 10 is shown oriented for operation within a drain trap housing 140 composed of materials suited to accommodate the particular fluid pressures for its intended use. The housing 140 is fastened to the periphery of the mounting plate 15 by suitable bolts 145 (only one shown) extending through the apertures 29 (FIG. 1) into suitable threaded bores in a housing wall 142 of the housing 140. A gasket 141 provides a fluid seal at the interface between the housing wall 142 and the mounting plate 15. An inner wall 144 of the housing 140 and the surface 20 of the mounting plate 15 define a closed chamber 150 which contains the valve mechanism 10.

In operational orientation, a sump area 155 of the chamber 150 accumulates undesirable liquid condensate 160 provided to the drain trap chamber 150 via the condensate inlet 25.

As the level of the condensate 160 rises, the buoyant float 40 moves upward in an arcuate path of revolution about the second linkage base pin joint 72. In response to upward movement of the float 40, the connecting arms 100,101, pivoting about the float arm pin joint 91 and the valve plug arm pin joint 81, pull the valve plug 55 away from the valve seat 60, the valve plug 55 being fastened to the valve plug arm 80 by a weld 56, the valve plug being intermediate the valve plug arm pin joint 81 and the first linkage base pin joint 71. The valve plug 55 moves away from the valve seat 60 in an arcuate path of revolution about the first linkage base pin joint 71 to establish an open valve condition.

Fluid communication is established between the chamber 150 and a threaded exhaust outlet bore 62 via a cylindrical valve seat fluid outlet conduit 61. Liquid condensate flows out of the drain trap via the exhaust outlet 62. By design, the valve mechanism is calibrated to maintain the liquid condensate level above the sealing interface of the valve plug 55 and valve seat 60.

The valve seat 60 includes a threaded nipple portion 63 which screws into a threaded bore extending into the wall thickness of the mounting plate 15. A headed portion 64 of the seat 60 serves as means for clamping the linkage base 70 to the mounting plate 15. The valve seat 60 is positioned between the first and second linkage base pin joints 71,72.

A detent 66 constituted by a dimple extending from the base portion 73 of the linkage base 70 and engaging with the surface 20 of the mounting plate 15 prevents any swiveling motion of the valve mechanism 10 about seat 60 and further aids in proper alignment of the valve mechanism 10 and mounting plate 15 during assembly.

The over-center stop link 110 pivotally connected to the valve plug arm pin joint 81 limits the upward movement of the float by limiting the maximum distance between the second linkage base pin joint 72 and the valve plug arm pin joint 81. It can be seen that as the float 40 rises, the stop link 110 pivots about the valve plug arm pin 130 and moves transversely relative to the second linkage bar pin joint 72 until the associated pin 125 reaches the upper end 111 of stop link slot 112 which receives the pin 125, whereupon further upward movement of the float 40 and valve plug 55 is prevented.

Figure 3:
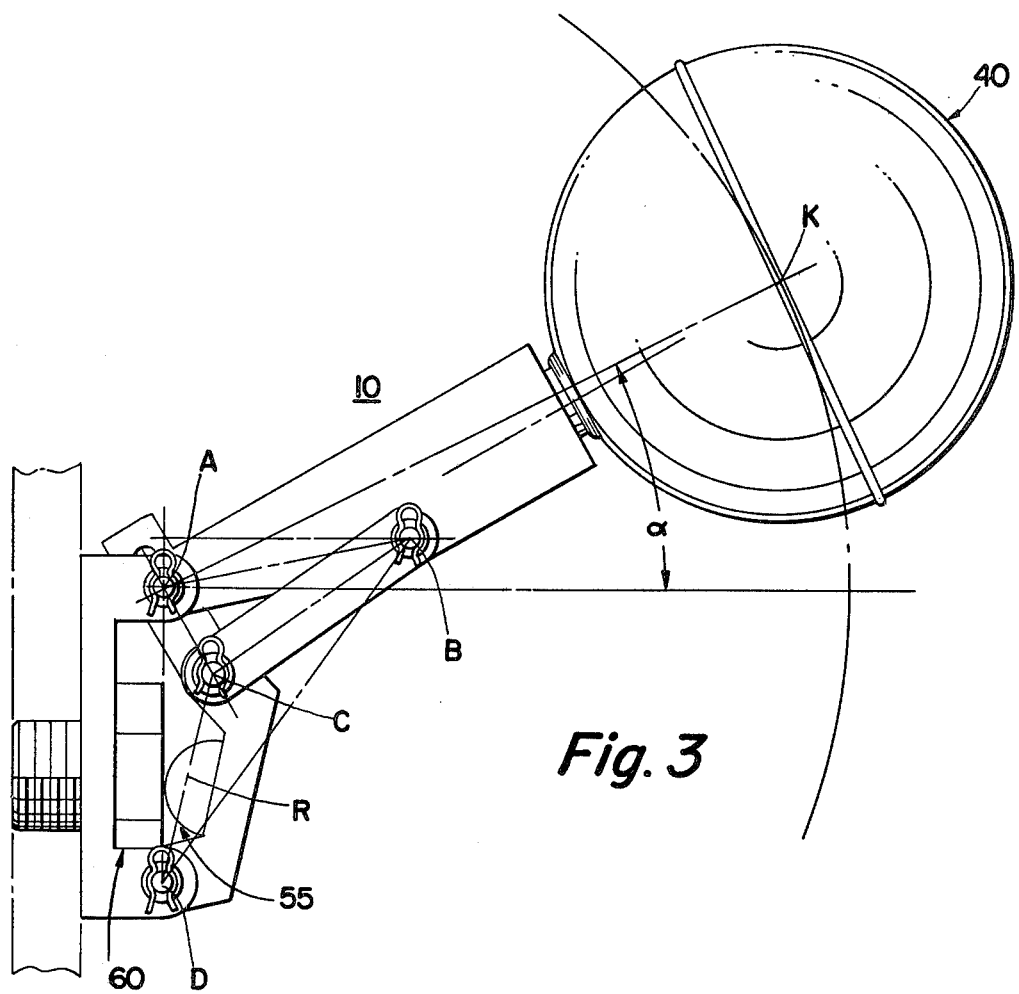
FIG. 3 is a vector diagram supplemented elevation view of the float actuated valve mechanism of FIG. 1 in an open position, with portions of the drain trap mounting plate cut away.

Turning to FIG. 3, the valve mechanism 10 is illustrated in an open condition wherein the valve plug 55 is pulled away from the seat 60.

The above-described four bar linkage, in accordance with the present invention, advantageously provides a non-linearly varying mechanical advantage between float movement and valve plug movement. The rate of change of mechanical advantage is not constant, with maximum mechanical advantage being applied to provide initial opening force for pulling the valve plug 55 away from the valve seat 60.

The following mathematical considerations, with reference to the vectors of FIG. 3, further illustrate the invention.

When the four bar linkage is in a closed position (FIG. 2) the mechanical advantage between the float 40 and valve plug 55 is expressed as follows:

$$\text{Mechanical Advantage } (MA) = \frac{AK}{AC} \times \frac{CD}{DR} \quad (1)$$

As the mechanism 10 begins to open with upward movement of the float 40 through an arc angle $\alpha$ the mechanical advantage is expressed as follows:

$$MA = \left[ \frac{(AK)\cos\alpha}{(AB)\sin\left(\tan^{-1}\frac{FD}{FB} - \alpha + \beta - \angle CBD\right)} \right] \times \left[ \frac{\sin\angle CBD}{CD} \times BD \times \right] \frac{CD}{DR} \quad (2)$$

Where $\beta = \tan^{-1} AC/BC$ $AF = AB \sin(\alpha - \beta)$ $DF = AD + AF$ $BF = AB \cos(\alpha - \beta)$ $BD = \sqrt{(DF)^2 + (BF)^2}$ $$\cos\angle CBD = \frac{(BC)^2 + (BD)^2 - (CD)^2}{2(BC)(BD)}$$

Figure 6:
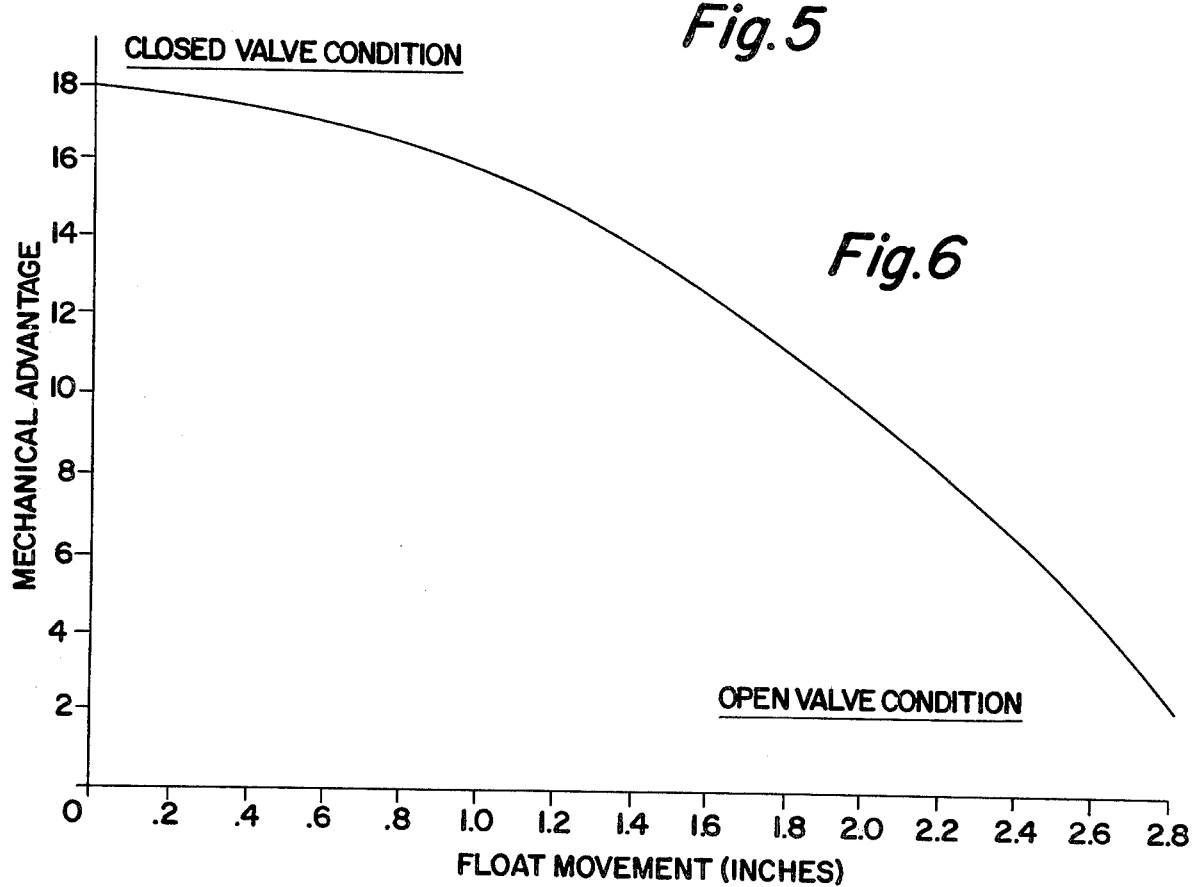
FIG. 6 is a graphical representation of the non-linearly varying mechanical advantage provided by a typical linkage in accordance with the present invention.

A graphical representation in accordance with equations (1) and (2) of float movement versus mechanical advantage for a typical drain trap-sized valve mechanism is illustrated in FIG. 6. It can be seen that the mechanical advantage at the closed valve condition is 18, while at the maximum open valve condition the mechanical advantage is 2.8.

Under typical operating conditions, the internal fluid pressure of the housing chamber 150 (FIG. 2) is much higher than the fluid pressure of the exhaust conduit 61 (FIG. 2). High mechanical force must be applied to pull the valve plug 55 away from the valve seat 60. As illustrated with regard to FIG. 6 and equations (1) and (2), such high mechanical force is provided by the present invention.

Once an open condition has been initiated, less force is required to further move the valve plug 55 and maintain it in an open condition. The valve mechanism 10 provides such decreased force (lower mechanical advantage), as previously illustrated. Such a valve mechanism inherently provides only the amount of float movement necessary to operate the valve, resulting in a space conserving valve mechanism package.

Figure 4:
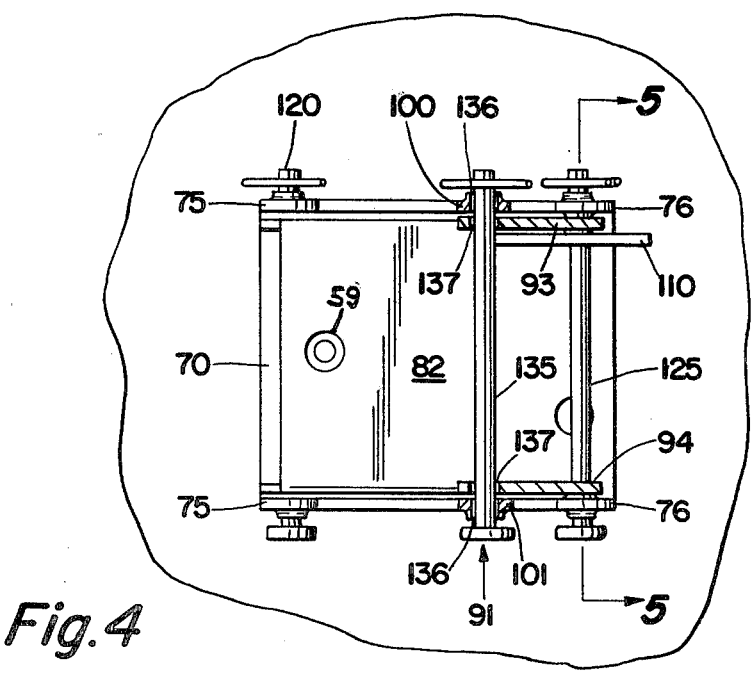
FIG. 4 is a sectional view of the four bar linkage taken along line 4—4 of FIG. 2.

FIG. 4 more clearly illustrates the four pin joints utilized in accordance with the invention. With reference to the float arm pin joint 91, bushing defining apertures 136 defined by the ends of the connecting rods 85 receive the associated pin 135 which also extends through bushing defining apertures 137 in the approximate mid-portions (float arm pin joint 91) of the float arm legs 93,94. The bushing defining aperture pairs 136,137 are adjacent each other for concentric pivotal movement about the pin 135 which defines the float arm pin joint 91. The apertures 136,136 are slightly larger than the diameter of the pin 135 to permit limited translational movement between the associated four bar linkage elements.

Figure 5:
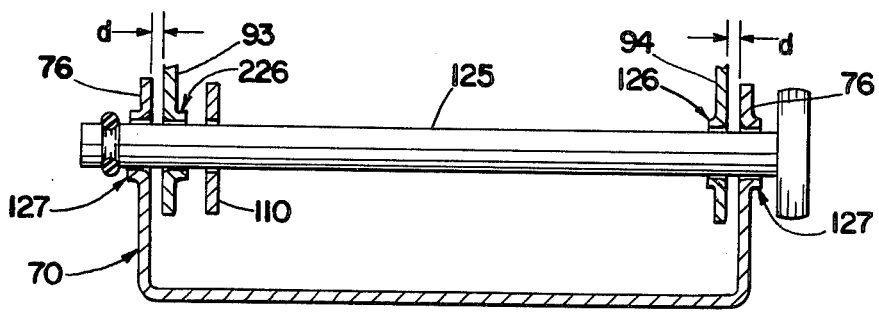
FIG. 5 is a sectional view of a pin joint taken along line 5—5 of FIG. 4.

Turning to FIG. 5 with particular reference to the second linkage base pin joint 72, it can be seen that in accordance with the present invention, limited clearance d between bushing defining portions 126 of float arm leg portions 93,94 and bushing defining portions 127 of tabs 76 provides for limited axial movement of the float arm 90 along pin 125 relative to the linkage base 70.

All four pin joints 71, 72, 81, and 91 are, in general, constructed as previously noted with regard to FIGS. 4 and 5. Such a construction permits limited translational movement of the four-bar linkage, including limited movement of the valve plug arm 80 relative to the linkage base 70 along the rotational axis provided by pin 120. Such movement of the valve plug arm 80, to which the valve plug 55 is fixed, and the linkage base 70, to which the valve seat 60 is fixed, permits self-alignment of the valve plug 55 and the valve seat 60.

Figure 7:
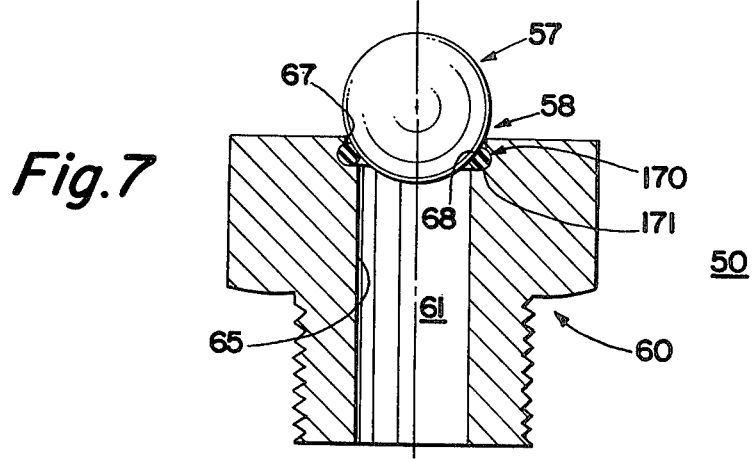
FIG. 7 is an enlarged cross section of the valve plug-valve seat assembly illustrated in FIG. 2.

The valve seat assembly 50 will now be described with reference to FIG. 7. The spherical valve plug or poppet member 55 is, for example, a rigid metal ball bearing having a first hemispheric portion 57 welded to a dimpled portion 59 (FIGS. 1,4) of the valve plug arm 80 (FIGS. 1,2), a second hemispheric portion 58 adapted for engagement with an annular rigid seating surface 67, and an adjacent and concentric, annular elastomeric seating surface 68 having a diameter smaller than that of surface 67, the surfaces 67 and 68 being located at the end of the conduit 61 within the drain trap chamber 150.

In accordance with the invention, the rigid seating surface 67, which is an integral portion of the valve seat 60, constitutes a load bearing surface limiting the amount of force applied to the elastomeric seating surface, while the elastomeric seating surface 68 constitutes a sealing surface compressible by a predetermined amount, the amount of force applied to the valve plug being distributed between the surfaces 67 and 68.

The elastomeric seating surface 68 constituting an inner sealing surface is preferably provided by a rubber-like O-ring 170 carried in an annular groove 171 adjacent the rigid valve seating surface 67 in the wall 65 defining the conduit 61. The outer diameter of the O-ring provides a circular outer sealing surface in sealing engagement with the annular groove 171.

The inside diameter of the O-ring 170 providing the elastomeric seating surface 68 is less than the diameter of the rigid seating surface 67 to permit simultaneous engagement of the hemispheric portion 58 with both of the rigid and elastomeric valve seat surfaces 67 and 68. It is recognized that the position of the valve seat surfaces could be reversed relative to the valve plug 55 whereby the rigid valve seat would be below and have a diameter less than that of the elastomeric valve seat.

Due to the limited transverse movement of the valve plug 55 relative to the axis of the seat 60, such limited movement being provided by the pin joints heretofore described with regard to FIGS. 4 and 5, self-alignment of the valve plug 55 against the seating surfaces 67 and 68 is advantageously provided by closing forces applied to the valve plug 55, causing it to center itself relative to the circular concentric seating surfaces 67 and 68.

Although the preferred embodiment of this invention is illustrated, it should be understood that various modifications and rearrangements of parts may be resorted to without departing from the scope of the invention as disclosed and claimed herein.

What is claimed is:

1. A float actuated valve mechanism for controlling the level of liquid in a sump area comprising:
   a fluid conduit communicating with said sump area;
   a valve seat means fixed to one end of said fluid conduit;
   a valve plug movable against said valve seat to close and open said one end of said fluid conduit;
   a linkage base fixed relative to said conduit and providing two linkage base pin joints;
   a float arm having one end attached to one of said linkage base pin joints, said float arm being pivotal about said linkage base pin joint to which said float arm is attached;
   a float within said sump area connected to the other end of said float arm;
   a valve plug arm having one end attached to the other of said linkage base pin joints, said valve plug arm being pivoted about said linkage base pin joints to which said valve plug arm is attached, said valve plug being mounted on said valve plug arm;
   a float arm pin joint provided by said float arm;
   a valve plug arm pin joint provided by said valve plug arm; and
   a connecting arm means extending between and pivotal about said float arm pin joint and said valve plug arm pin joint, said linkage base and said arms constituting a fourbar linkage providing a non-linearly varying mechanical advantage between said float and said valve plug, said arms, said float and said valve plug being movable in a generally common plane.

2. A float actuated valve mechanism according to claim 1, wherein said pin joints provide limited clearance between adjacent arm and base portions, such clearance permitting self-alignment movements of said valve plug relative to said valve seat.

3. A float actuated valve mechanism according to claim 1, wherein said valve plug is mounted on said valve plug arm intermediate of said valve plug arm pin joint and said linkage base pin joint to which said plug arm is attached.

4. A float actuated valve mechanism according to claim 1, wherein said float arm pin joint is intermediate said float and said linkage base pin joint to which said float arm is attached.

5. A float actuated valve mechanism according to claim 1, wherein said valve seat is intermediate said two linkage base pin joints.

* * * * *